(12) United States Patent
Alshammari et al.

(10) Patent No.: US 12,484,992 B1
(45) Date of Patent: Dec. 2, 2025

(54) MECHANICAL METHOD OF DETERMINING THE BEST MATERIAL FOR USE AS CLEAR ALIGNER COMPOSITE RESIN ATTACHMENT AMONG EXPERIMENTED GROUPS

(71) Applicant: KING SAUD UNIVERSITY, Riyadh (SA)

(72) Inventors: Rana Rabei Alshammari, Riyadh (SA); Aljazi Hussain Aldweesh, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 19/248,380

(22) Filed: Jun. 24, 2025

(51) Int. Cl.
*A61C 7/08* (2006.01)
*G01N 3/56* (2006.01)

(52) U.S. Cl.
CPC ........ *A61C 7/08* (2013.01); *G01N 3/56* (2013.01)

(58) Field of Classification Search
CPC ....................................................... G01N 3/56
See application file for complete search history.

(56) References Cited

U.S. PATENT DOCUMENTS

| | | | | |
|---|---|---|---|---|
| 6,086,373 A | * | 7/2000 | Schiff | A46D 1/00 15/167.1 |
| 10,842,380 B2 | * | 11/2020 | Sato | A61B 5/0088 |
| 10,905,179 B2 | * | 2/2021 | Epperson | A41D 13/0518 |
| 11,596,502 B2 | * | 3/2023 | Webber | A61C 7/146 |
| 11,826,220 B2 | * | 11/2023 | Pechersky | A61C 7/36 |
| 11,911,236 B2 | * | 2/2024 | Parkar | A61C 7/08 |
| 12,156,740 B2 | * | 12/2024 | Kim | A61B 5/4833 |
| 2023/0210453 A1 | * | 7/2023 | Brawn | A61C 7/00 433/6 |

FOREIGN PATENT DOCUMENTS

| | | | | |
|---|---|---|---|---|
| CN | 1834613 A | | 9/2006 | |
| CN | 101071096 A | | 11/2007 | |
| CN | 103364335 A | | 10/2013 | |
| CN | 101686852 B | * | 12/2014 | ........ A61C 19/063 |
| CN | 103226911 B | | 2/2015 | |
| CN | 110186801 A | | 8/2019 | |
| CN | 113686558 A | | 11/2021 | |
| CN | 114993868 A | * | 9/2022 | ........... G01N 3/59 |
| EP | 2405784 B1 | | 3/2013 | |
| WO | 2021000529 A1 | | 1/2021 | |

* cited by examiner

*Primary Examiner* — Octavia Hollington
(74) *Attorney, Agent, or Firm* — Nath, Goldberg & Meyer; Joshua B. Goldberg

(57) ABSTRACT

An orthodontic method includes forming a plurality of abrasive objects, each abrasive object including material usable for forming clear dental aligners. The plurality of abrasive objects can be rubbed against a plurality of composite objects, each composite object being made of a composite material usable for forming attachments on teeth in dental clear aligner therapy. An amount of wear on the plurality of composite objects as a result of the rubbing step can be determined. A composite object with a least amount of wear from among the plurality of rubbed composite objects can be identified. The composite material of the composite object identified as having the least amount of wear can be utilized to make an attachment for a tooth of a clear dental aligner therapy patient. The attachment can be affixed to a tooth of the dental patient.

16 Claims, 6 Drawing Sheets

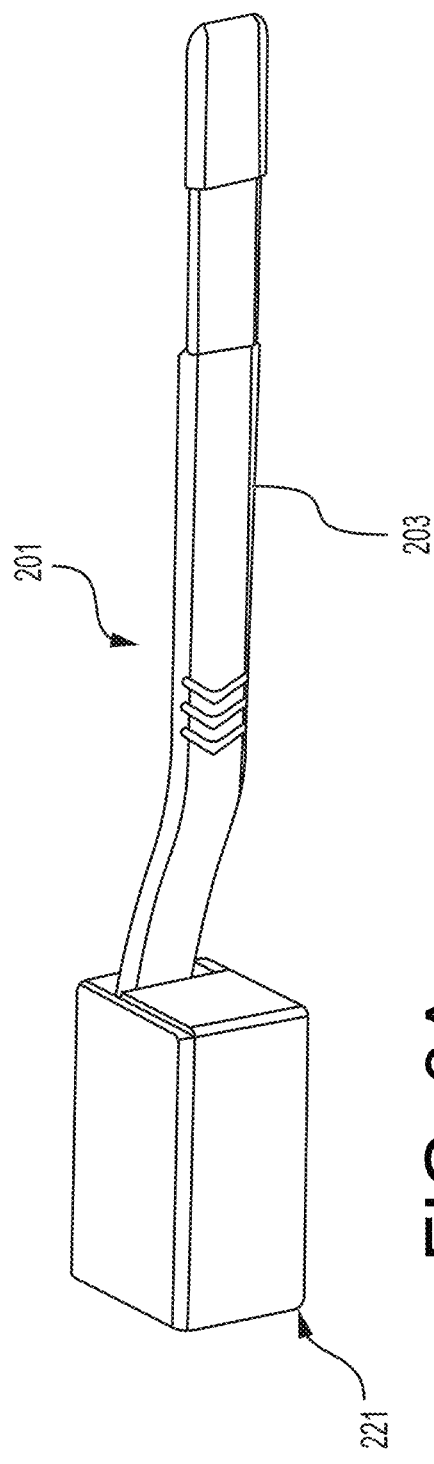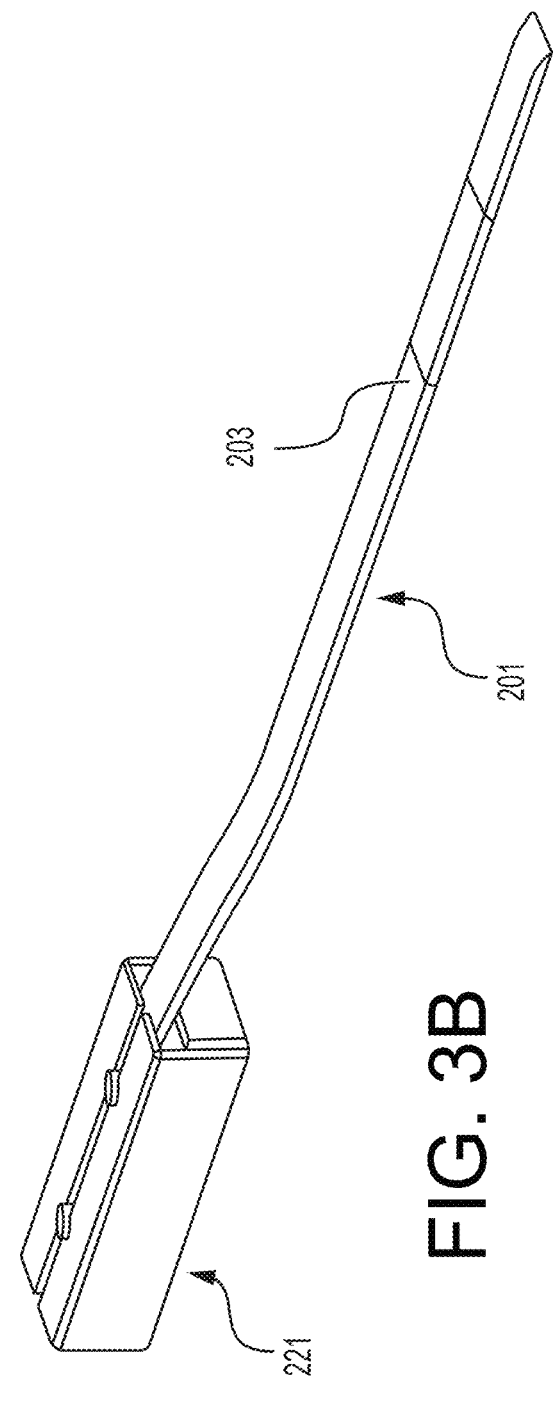
FIG. 3A
FIG. 3B

MECHANICAL METHOD OF DETERMINING THE BEST MATERIAL FOR USE AS CLEAR ALIGNER COMPOSITE RESIN ATTACHMENT AMONG EXPERIMENTED GROUPS

TECHNICAL FIELD

The present disclosure relates to orthodontics, and more particularly, to a method for determining a suitable material for use as an attachment in clear aligner therapy.

DISCUSSION OF THE RELATED ART

Orthodontic treatment is desirable and often necessary for a large number of individuals. Clear aligner therapy (CAT) includes utilizing clear aligners, designed to be worn by a patient in the upper and/or lower dental arches, to improve the alignment of the patient's teeth. CAT therapy is desirable because it can provide a virtually discomfort-free experience while being aesthetically desirable (especially in light of older orthodontic treatment methods that require metal braces) and, importantly, effective.

The CAT process often starts with obtaining a polyvinyl impression or an intraoral scan of a patient's dental arches. When utilizing an intraoral scan, the scan is converted to a digital model. The polyvinyl impression and/or the digital model of the dental arches can be used as a starting point for devising an appropriate orthodontic treatment plan for the patient.

For example, the digital model of a patient's arches can be utilized in conjunction with a software capable of reading the same to predict how the individual teeth of a patient will move as a result of the patient wearing clear aligners.

Sometimes, a projection of material (e.g., a small block of composite material) needs to be attached to the exterior of one or more teeth of a patient. This block of material is commonly referred to as an "attachment." Each attachment is configured to be pressed by the clear aligner (when the clear aligner is worn) in order to move its respective tooth in a desired way. The shape and/or length of each attachment affects how the attachment will cause its tooth to move. Alterations to the shape and/or length of an attachment after bonding the attachment to a patient's tooth can negatively affect the desired/projected movement of the tooth.

Clear aligners should be removed at least once a day or more frequently for eating and brushing teeth. However, the repetitive removal and re-wearing of a clear aligner over an extended period of time causes wear on the attachment(s) due to the friction (or rubbing) that results between the aligner and the attachment(s) as the patient removes and re-wears the aligner. The wear reduces the length, width and/or thickness of the attachment(s).

In addition, the process of brushing one's teeth will likely cause further wear on the attachment(s) since toothpaste typically contains fine abrasive material.

The combined effect of removing the aligners and brushing one's teeth over an extended period of time can wear out the attachment(s) on a patient's teeth rapidly and to a degree where it may significantly affect the CAT process in a negative way.

SUMMARY

The present disclosure relates to a method for testing the surface abrasion resistance of composite material that is used for forming dental attachments in dental clear aligner therapy (CAT). In addition, the present subject matter relates to using a composite material having a good resistance to surface abrasion for forming dental attachments in CAT.

Different manufacturers use different compositions of composite material for forming dental attachments in CAT. As such, the attachments made by different manufacturers have different levels of resistance to abrasion.

Although dental attachment material is known to be made of polymeric material (e.g., plastic), manufacturers generally keep the detailed composition of the material (e.g., the polymeric substance(s) used and/or their exact respective ratios in the compound) secret. However, the manufacturers assign different trade names to their dental attachment materials. As such, the trade names can be used to keep track of the abrasion resistance of the different materials available in the marketplace for making dental attachments.

The present subject matter includes using a toothbrush simulator machine to rub (or move) the head portion of a modified toothbrush against an object made of the same material as a dental attachment. For example, a toothbrush can be rubbed against a tray that is loaded with a dental attachment material. The head portion of the brush is wrapped in a material suitable for making clear dental aligners. This way, the toothbrush simulator can be used to rub (or move) the clear dental aligner material on the head portion of the brush against the dental attachment material on the tray for a period of time (and by using different motions and/or varying or keeping constant the amount of force by which the head portion of the toothbrush presses against the tray, according to a programmed wear cycle selected on the toothbrush simulator) to determine the amount of wear that the clear aligner material causes on the dental attachment material.

The toothbrush simulator can be loaded with several toothbrushes prepared as indicated above and with several trays. The plurality of trays can be loaded with different dental attachment material. Each toothbrush can be paired with a tray. The toothbrush simulator machine can then be operated to run a predefined wear cycle on the loaded toothbrushes and trays. Since the different trays can be loaded with different CAT attachment material, the wear resistance of the attachment material corresponding to each tray can be inspected at the end of the wear cycle.

The dental attachment material showing the least amount of surface wear at the end of a wear cycle can be deemed as being preferred or desirable for manufacturing dental attachments.

The preferred/desirable material can then be used to manufacture dental attachment(s) for CAT patients.

BRIEF DESCRIPTION OF THE DRAWINGS

The above and other features of the present disclosure will become more apparent by describing in detail exemplary embodiments thereof in conjunction with the accompanying drawings, in which:

FIG. 3A is a first perspective view illustrating the toothbrush and cover of FIG. 2 coupled to one another;

FIG. 3B is a second perspective view illustrating the toothbrush and cover of FIG. 2 coupled to one another;

DETAILED DESCRIPTION OF THE EMBODIMENTS

Figure 1:
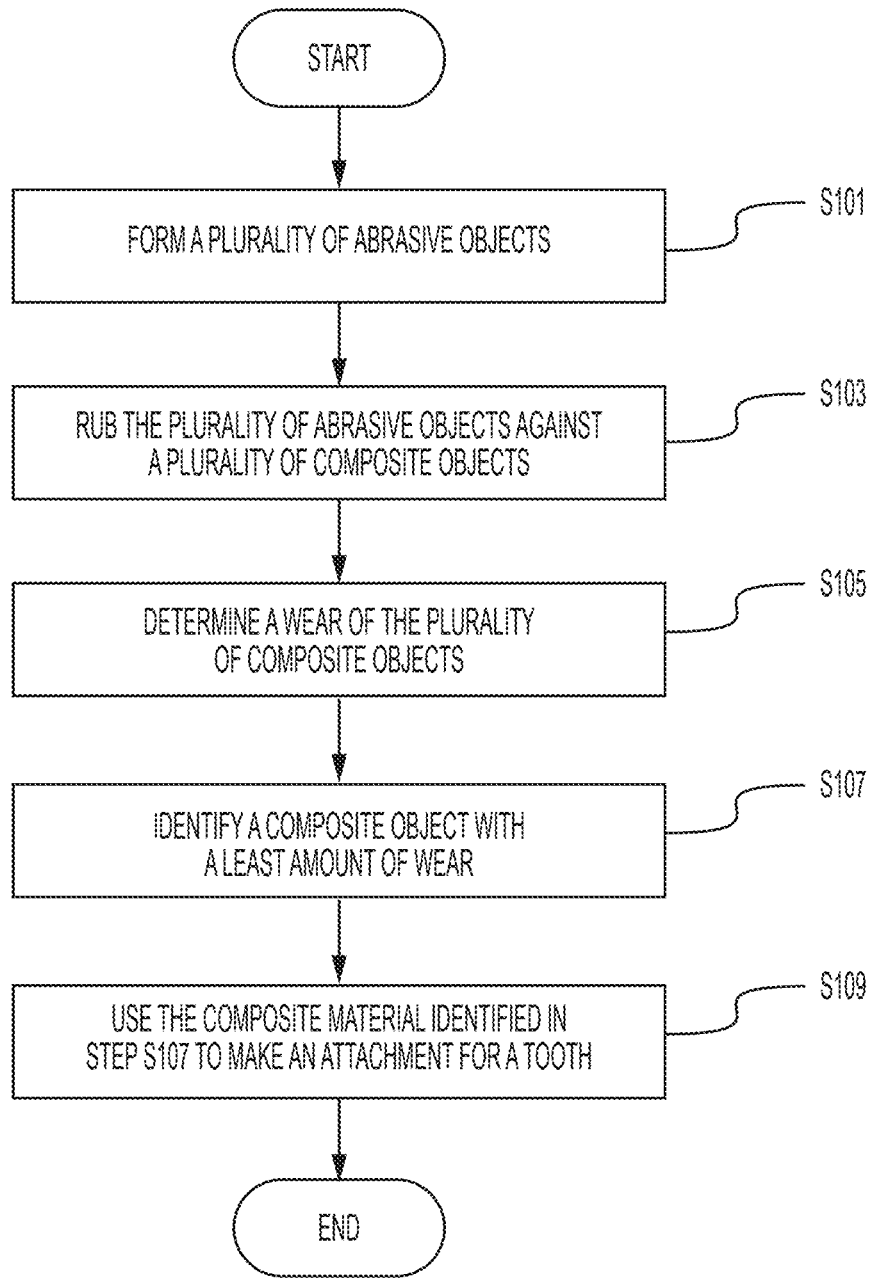
FIG. 1 is a flowchart illustrating an orthodontic method in accordance with an embodiment of the present subject matter.

Exemplary embodiments of the present disclosure will be described more fully hereinafter with reference to the accompanying drawings. The present disclosure may, however, be embodied in different forms and should not be construed as being limited to the embodiments set forth herein. Like reference numerals may refer to like elements throughout the specification. The sizes and/or proportions of the elements illustrated in the drawings may be exaggerated for clarity.

When an element is referred to as being disposed on another element, intervening elements may be disposed therebetween. In addition, elements, components, parts, etc., not described in detail with respect to a certain figure or embodiment may be assumed to be similar to or the same as corresponding elements, components, parts, etc., described in other parts of the specification.

When a layer of material is described as being stack on another layer of material, intervening layers of material may be disposed therebetween.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps. In addition, the method steps taught in this specification need not necessarily be performed in the order in which they are described, unless the context clearly indicates otherwise.

It is noted that, as used in this specification and the appended claims, the singular forms "a", "an", and "the" may include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Referring to FIG. 1, an orthodontic method includes forming a plurality of abrasive objects (step S101). Each abrasive object from the plurality of abrasive objects includes material usable for forming clear dental aligners. The material usable for forming clear dental aligners can be disposed on an exterior of the abrasive object (or form the exterior of the abrasive object). The material that is usable for forming clear dental aligners may be referred to as abrasive material in this specification.

Material that is usable for forming clear dental aligners includes thermoplastics. Examples of suitable thermoplastics include, without limitation, thermoplastic polyurethane (TPU), polyethylene terephthalate glycol (PETG), blends thereof, and/or layers of TPU and PETG stacked on one another.

In addition, material that is usable for forming clear aligners includes polyester, polyurethane, polypropylene, blends thereof, etc.

In an example, a sheet including a first layer of TPU material, a layer of PETG material stacked (or disposed) on the first layer of TPU material, and a second layer of TPU material stacked (or disposed) on the PETG material layer may be used as material that is usable for forming clear aligners. In this example, the multilayer sheet may be provided as a unitary sheet of material (e.g., as one bonded item), as differentiated from a plurality of loose material layers.

The forming of the plurality of abrasive objects in step S101 may include obtaining a plurality of test objects. A test object may be a toothbrush or may generally resemble a toothbrush. See an exemplary test object 201 in FIG. 2. In an example, each test object may be shaped and/or sized to be loaded in a toothbrush simulator machine such that each test object can be used by the toothbrush simulator machine to perform a wear test on a composite object, as will be described below in detail.

Each test object includes a handle and a head portion extending from the handle. See FIG. 2, illustrating a handle 203 and a head portion 205 of the test object 201.

The forming of the plurality of abrasive objects in step S101 may include obtaining a plurality of covers, each cover having at least one sidewall, the at least one sidewall forming an interior chamber of the cover and defining an exterior of the cover.

Figure 2:
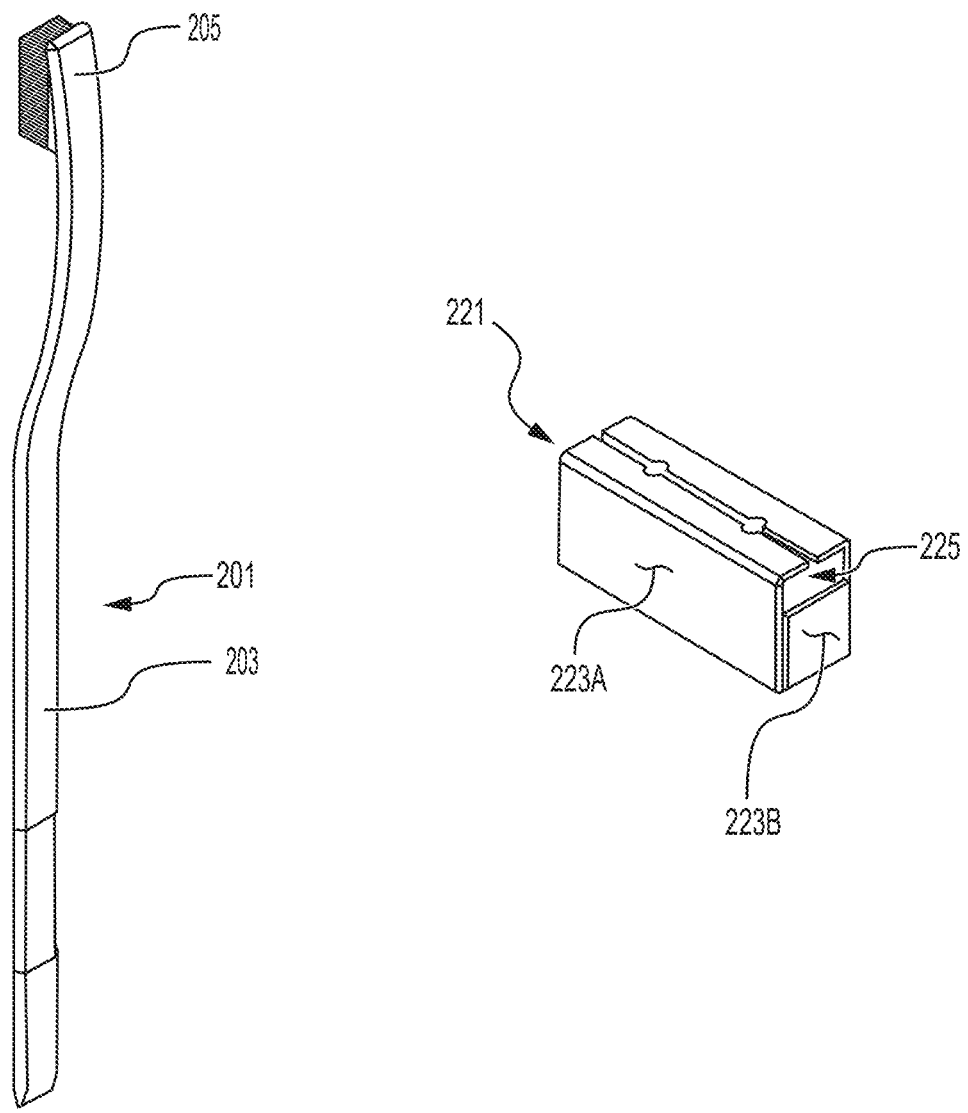
FIG. 2 is a perspective view illustrating a toothbrush and a cover for the toothbrush that can be used to perform the method of FIG. 1.

For example, FIG. 2 illustrates an exemplary cover 221. As an example, the cover 221 includes a plurality of sidewalls 223A, 223B. Merely as an example, cover 221 includes four sidewalls 223A and two sidewalls 223B. The sidewalls 223A, 223B define an exterior of the cover 221 and an internal chamber 225 in the cover 221. The internal chamber 225 may be configured to selectively receive the head portion of a test object therein (e.g., the head portion 205 in the example of FIG. 2). A cover as described in this specification may be shaped and/or sized to accommodate bristles of a head portion of a test object.

The at least one sidewall of a cover as described in this specification may also be curved, tubular, have an irregular shape, or have a combination of the shapes described above so long as it can fit the head portion of a test object inside Each test object and each cover used in accordance with the teachings of this specification may be made of a material capable of withstanding heat and/or pressure to a certain degree without warping, melting, or otherwise deforming. For example, each test object and each cover may be made of a material capable of withstanding the heat and/or vacuum that can be applied thereon by a vacuum forming machine.

Each test object and each cover may be made, for example, of a metal or a metal alloy. The metal/alloy may include, merely as example, steel (stainless steel being one example of steel). Other metals that can withstand the heat and/or vacuum that can be applied thereon by a vacuum forming machine may be used. For example, aluminum, brass, nickel, etc., can be used for forming the test objects and covers.

The forming of the plurality of abrasive objects in step S101 may include inserting the head portion of each test object of the plurality of obtained test objects in the interior chamber of a respective cover of the plurality of covers. As can be gleaned with reference to FIGS. 3A, 3B, the head portion 205 of the test object 201 can be inserted in the interior chamber 225 of cover 221.

The forming of the plurality of abrasive objects in step S101 may include securing the head portion of each test object to its respective cover. The securing step may include, for example utilizing screws or other mechanical fastening mechanisms for connecting each cover to the head portion of its respective test object in a secure or sturdy fashion. This way, each test object and cover assembly can withstand the heat and/or compression that may be exerted thereon by a vacuum forming machine without disconnecting from one another.

The forming of the plurality of abrasive objects in step S101 may also include covering each cover of the plurality of covers with the material usable for forming clear dental aligners as described in this specification.

In an approach, the covering of the plurality of covers with the material usable for forming clear dental aligners may include using a vacuum forming machine. For example, each test object, with the cover attached to the head portion thereof, may be inserted in a vacuum forming machine. More specifically, the head portion of each test object with the cover thereon may be inserted in a vacuum forming machine.

Figure 4A:
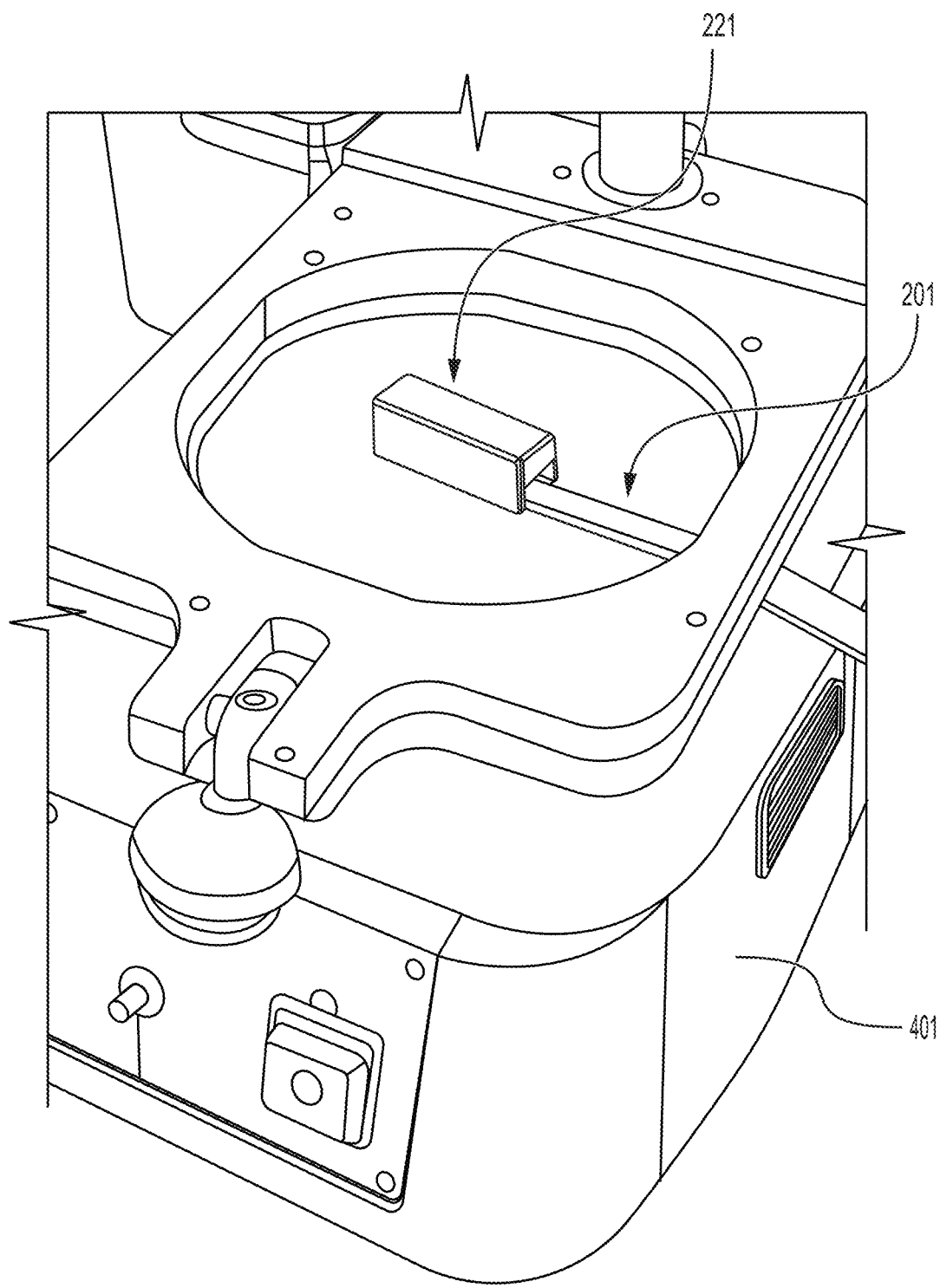
FIG. 4A is a perspective view illustrating the toothbrush and cover of FIG. 2 inserted in a vacuum forming machine.

See FIG. 4A, illustrating the test object 201 with its cover 221 inserted in a vacuum forming machine 401. The vacuum forming machine 401 may be any apparatus usable for vacuum wrapping a sheet of clear aligner material on the exterior of the cover of a test object. For example, a vacuum forming machine bearing the trademark HENRY SCHEIN, and having model number 1006234G8 and/or 7000787 can be used for covering of the plurality of covers with a sheet of material usable for forming clear dental aligners.

Figure 4B:
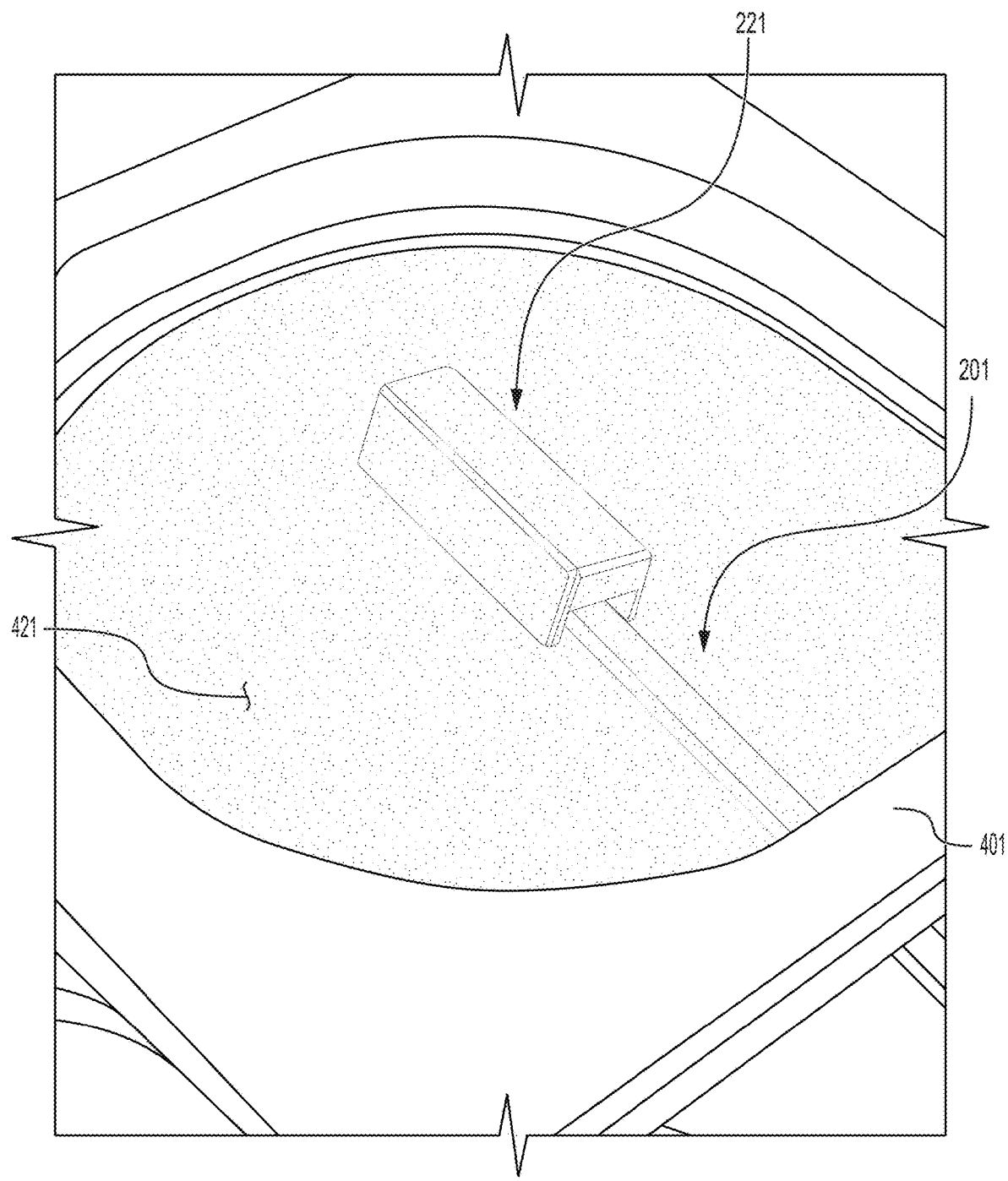
FIG. 4B is a perspective view illustrating the toothbrush and cover of FIG. 2, inserted in the vacuum forming machine of FIG. 4A, with a sheet of abrasive material disposed on the toothbrush and cover.

A sheet of TPU-PETG-TPU material layers stacked on one another may be disposed on the cover, and the vacuum machine can be operated (by exerting vacuum and/or heat) to wrap (e.g., permanently secure) the sheet of TPU-PETG-TPU layers on the exterior of the cover. See FIG. 4B, illustrating a sheet 421 of TPU-PETG-TPU material layers laid on the cover 221 prior to the vacuum forming process that will wrap (and affix) the sheet 421 to the exterior of the cover 221. This procedure can be repeated for every test object. In an example, a sheet of TPU-PETG-TPU material that is approximately 0.76 mm thick can be used to wrap the cover of each test object.

While a unitary sheet containing TPU-PETG-TPU material layers stacked on one another can be used, individual layers of TPU material and PETG material can also be overlaid on one another to form a TPU-PETG-TPU layer structure on the over of each test object.

The vacuum forming machine indicated in this specification can be used for covering the plurality of covers with the material usable for forming clear dental aligners (e.g., for wrapping each cover 221 with a 0.76 mm thick TPU-PETG-TPU sheet).

Referring to FIG. 1, the method includes rubbing the plurality of abrasive objects formed in step S101 against a plurality of composite objects (step S103).

Each composite object referred to in step S103 may be an object made of a composite material that is usable for forming attachments in clear aligner therapy. An attachment (or a dental attachment) as referred to in this specification, is a small three-dimensional object (e.g., a small post or similar structure) that can be attached, adhered or otherwise formed on an exterior of a tooth located in a dental arch that will receive a clear dental aligner. The attachments are configured to engage the clear aligner to move a tooth in a particular way over an extended period of time.

In step S103, each abrasive object may be rubbed on a different composite object from among the plurality of composite objects. The term rub, as used in the specification, generally, and without limitation, includes the process of placing a first object over a second object such that the first object makes contact with the second, and moving the first object relative to the second, or vice-versa, with some compressive pressure applied between the first and second objects. The rubbing process may be carried out dry, that is, without any lubricating, wetting or other foreign substance introduced at the interface between the first and second objects, or with a fluid (e.g., water), toothpaste, etc., or a combination thereof introduced at the interface between the first and second objects.

The rubbing the plurality of abrasive objects against the plurality of composite objects in step S103 includes loading a toothbrush simulator machine with the plurality of composite objects. Each composite object may be loaded on a different tray in a secure manner such that each composite object does not move relative to its tray. The composite objects, as described in this specification, may be made of different material suitable for forming dental attachments. Each composite object may be, for example, a layer of composite material formed on its respective tray, a block of composite material attached to its respective tray, etc. Therefore, the resistance to abrasion of different materials usable for dental attachments may be tested simultaneously by using the teachings of this specification.

Step S103 may include loading the plurality of test objects on the toothbrush simulator machine in a way that pairs each test object with one composite object from the plurality of composite objects. For example, each test object 201 can be attached to a toothbrush simulator machine (the handle 203 of each test object 201 can be selectively coupled to the toothbrush simulator machine) with the head portion 205 of the test object positioned over (or on) one of the composite objects (i.e., on the composite object paired to that test object).

The toothbrush simulator machine usable for performing step S103 can be a known type of a toothbrush simulator. Merely as an example, a ZM-3.8 toothbrush simulator machine, manufactured by SD Mechatronik GMBH, of Feldkirchen-Westerham, Germany, can be used to perform step S103.

The plurality of test objects that are attached to the toothbrush simulator machine to perform step S103 should have their respective covers secured thereto, and the covers should be covered in the material usable for forming clear dental aligners. As indicated elsewhere in this specification, in step S103 the cover of each test object may be positioned to rub against a respective one of the composite objects.

Figure 5:
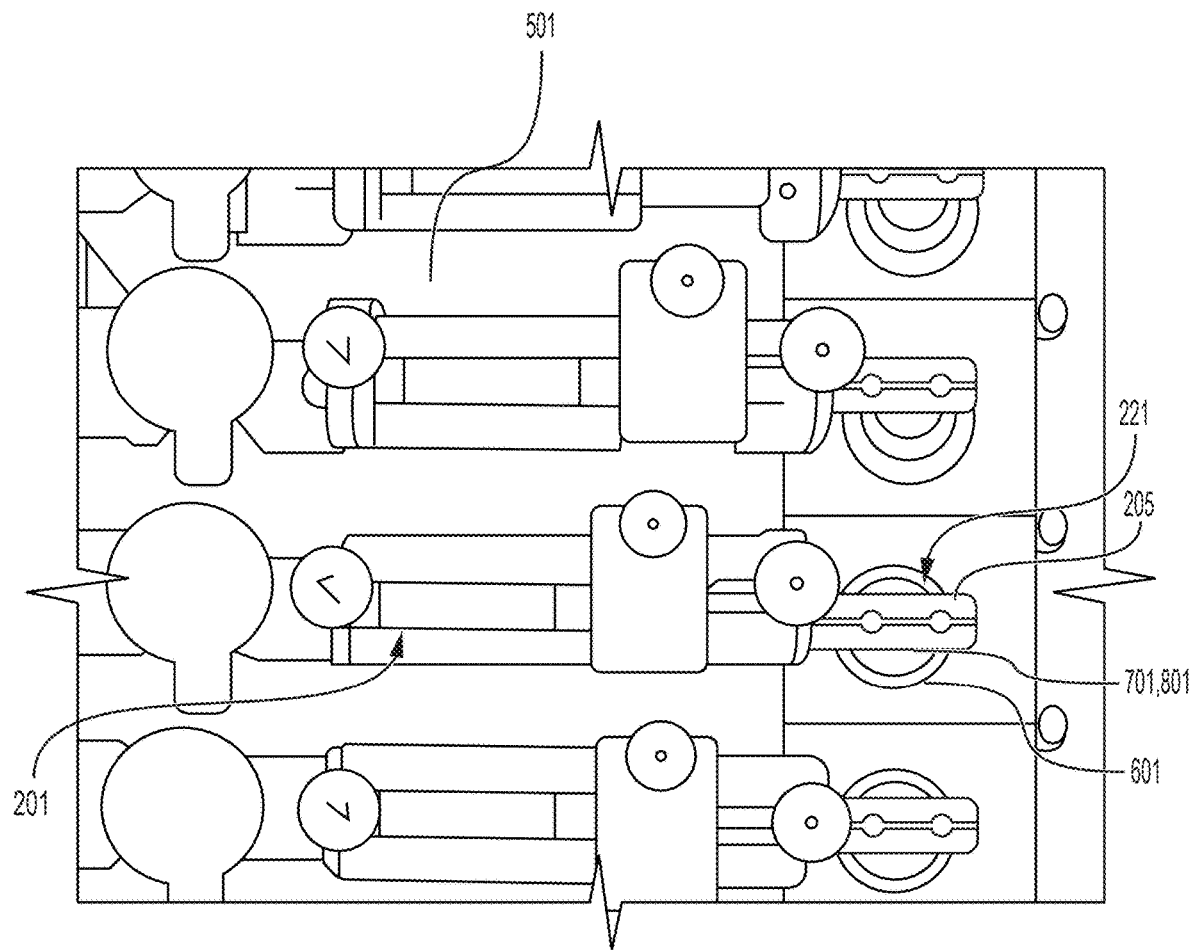
FIG. 5 is a top view illustrating a portion of a toothbrush simulator machine with a plurality of toothbrushes and covers, as illustrated in FIG. 2, coupled to the toothbrush simulator machine with a tray made of dental attachment material positioned under the head portion of each toothbrush.

FIG. 5 is a top view illustrating a portion of a toothbrush simulator machine 501 with a plurality of test objects 201 and a plurality of composite objects 701 loaded on (or connected to) the toothbrush simulator machine 501. The composite objects 701 may be loaded on respective trays 601, as described in this specification, and the trays 601 may be coupled to the toothbrush simulator machine 501. As illustrated in FIG. 5 and described in this specification, each tray 601 may be loaded with a layer of dental attachment material 701 (i.e., the composite object 701) that has a certain thickness and that may cover an entire storage area of the tray 601. Each tray 601 may be positioned under the head portion 205 of a respective toothbrush (or test object) 201.

In an approach, the cover of each test object of the plurality of test objects in step S103 may include the same material usable for forming clear dental aligners on its exterior as the other covers. In this approach, at least two of the composite objects can be made of different dental attachment material. This way, the abrasion resistance of different dental attachment materials to the same abrasive material (or clear dental aligner material) can be observed in step S105.

In another approach, the covers of different test objects can be covered with different material usable for forming clear aligners, and the composite objects may be made of the same or different material (usable for forming attachments) as one another.

Step S103 may include selecting a predefined toothbrush simulator cycle for each test object. The simulator cycle may be, for example, a 6 month wear cycle, a 1 year wear cycle, a 2 year wear cycle, etc. Wear cycles include moving the test object in a certain way (e.g., back and forth, left to right, in an arcuate path, etc., or a combination thereof) with the cover of each test object rubbing on its respective composite object.

The toothbrush simulator can also be configured to have the cover of each test object apply a certain amount of force (or pressure) on its respective composite object. This way, a toothbrush simulator cycle of the toothbrush simulator machine can be used to rub each test object on its composite object for a period of time.

The wear that results on each composite object from the wear cycle of the simulator machine simulates the wear that would occur on the dental attachment(s) of a user from the rubbing that occurs when the user removes and re-wears a clear aligner at least once a day for an extended period of time (e.g., for 6 months, 1 year, etc., as the case may be) for dental attachment(s) made of the same material as the composite object.

Step S103 may also include adding a fluid (e.g., water) and/or toothpaste on each composite object (e.g., dental attachment material 701) before the start of a predefined toothbrush simulator cycle and/or while a predefined toothbrush simulator cycle is ongoing such that the fluid and/or toothpaste is present at the interface between each composite object and its respective abrasive object. The presence of water between the cover of each test object and its respective composite object can aid in accurately simulating the wear that would occur in dental attachments present on a user's teeth since the mouth is typically a wet environment due to the presence of saliva. That is, the attachments on a user's mouth will likely be wet prior to the user re-wearing the clear aligner (after eating and/or brushing the teeth) and/or when removing an aligner after having worn it for a period of time.

In addition, the presence of toothpaste between the cover of each test object and its respective composite object can aid in accurately simulating the wear that would occur in dental attachments disposed on a user's teeth since a user of clear aligners is expected to brush their teeth every day.

Step S103 may include operating the toothbrush simulator machine to perform the predefined (selected) toothbrush simulator cycle for each test object. As described in this specification, the operating step includes moving the plurality of test objects such that the material usable for forming clear dental aligners on the cover of each test object rubs against its respective composite object in accordance with the predefined toothbrush simulator cycle selected for each test object.

In step S105, the method includes determining an amount of wear on the plurality of composite objects as a result of the rubbing in step S103. Step S105 may include visually observing the composite objects to determine and/or using appropriate measuring instruments to determine the amount of wear. For example, step S105 may include determining the depth of a groove formed on the exterior surface of each composite object as a result of being rubbed, the depth of a concavity formed on the exterior surface of each composite object as a result of being rubbed, the amount of material loss in each composite object due to the rubbing step, whether said amount of material indicates a reduction of height of the composite object, a reduction of mass of the composite object, etc., or more generally, determining the depth of a recess caused on each composite object due to the performance of step S103.

The method of FIG. 1 includes identifying a composite object with a least amount of wear from among the plurality of rubbed composite objects (step S107). Merely as an example, the composite object having the shallowest recess caused thereon due to the performance of step S103 can be identified as the composite object having the least amount of wear.

The method of FIG. 1 includes using the composite material that the composite object identified in step S107 is made of to make an attachment for a tooth of a clear dental aligner therapy patient (step S109).

Step S109 may include forming a first attachment of a same composite material as the composite object identified in step S107 as having the least amount of wear and affixing the first attachment to a tooth of a dental patient. This step can be repeated for each tooth of the patient deemed to require an attachment.

Step S109 may also include forming a clear aligner and wearing the clear alignment on the dental patient's mouth. The wearing step causes the clear aligner to rub against the attachment.

In step S109, the clear aligner can be formed of a same abrasive material as the material included in the exterior of the plurality of abrasive objects.

While the present disclosure has been particularly shown and described with reference to exemplary embodiments thereof, it will be apparent to those of ordinary skill in the art that various changes in form and detail may be made therein without departing from the spirit and scope of the present disclosure as defined by the following claims.

What is claimed is:

1. An orthodontic method, comprising:
   forming a plurality of abrasive objects, each abrasive object from the plurality of abrasive objects including material usable for forming clear dental aligners on an exterior of said abrasive object;
   rubbing the plurality of abrasive objects against a plurality of composite objects, each composite object being made of a composite material, each abrasive object being rubbed on a different composite object from among the plurality of composite objects, wherein the composite material of each composite object is usable as material for forming attachments on teeth in dental clear aligner therapy;
   determining an amount of wear on the plurality of composite objects as a result of the rubbing;
   identifying a composite object with a least amount of wear from among the plurality of rubbed composite objects; and
   using the composite material that the composite object identified as having the least amount of wear is made of to make an attachment for a tooth of a clear dental aligner therapy patient.

2. The method of claim 1, wherein the material usable for forming clear dental aligners on the exterior of each said abrasive object is thermoplastic polyurethane (TPU).

3. The method of claim 1, wherein the material usable for forming clear dental aligners on the exterior of each said abrasive object includes a first layer of thermoplastic polyurethane (TPU), a layer of polyethylene terephthalate glycol (PETG) formed on the first layer of TPU, and a second layer of TPU formed on the layer of PETG.

4. The method of claim 3, wherein the first layer of TPU or the second layer of TPU forms the exterior of each said abrasive object.

5. The method of claim 1, wherein the forming of the plurality of abrasive objects includes:
   obtaining a plurality of test objects, each test object having a handle and a head portion extending from the handle;
   obtaining a plurality of covers, each cover having at least one sidewall, the at least one sidewall forming an interior chamber of the cover and defining an exterior of the cover;
   inserting the head portion of each test object in the interior chamber of a respective cover of the plurality of covers;
   securing the head portion of each test object to its respective cover; and
   covering each cover of the plurality of covers with the material usable for forming clear dental aligners.

6. The method of claim 5, wherein the covering of each cover with the material usable for forming clear dental aligners includes forming a first layer of thermoplastic polyurethane (TPU) on an exterior of the cover, forming a layer of polyethylene terephthalate glycol (PETG) on the first layer of TPU, and forming a second layer of TPU on the layer of PETG.

7. The method of claim 5, wherein the covering of each cover with the material usable for forming clear dental aligners includes vacuum forming a sheet of clear aligner material on an exterior of each cover of the plurality of covers, wherein, on each cover, the sheet of clear aligner material includes a first layer of thermoplastic polyurethane (TPU), a layer of polyethylene terephthalate glycol (PETG) disposed on the first layer of TPU, and a second layer of TPU disposed on the layer of PETG.

8. The method of claim 5, wherein the plurality of covers is made of metal.

9. The method of claim 8, wherein the metal is steel.

10. The method of claim 5, wherein the rubbing the plurality of abrasive objects against the plurality of composite objects includes:
    loading a toothbrush simulator machine with the plurality of composite objects;
    loading the plurality of test objects on the toothbrush simulator machine in a way that pairs each test object with one composite object from the plurality of composite objects, the plurality of test objects having their respective covers secured thereto and said respective covers being covered in the material usable for forming clear dental aligners, the cover of each test object being positioned to rub against a respective one of the composite objects;
    selecting a toothbrush simulator cycle for each test object; and
    operating the toothbrush simulator machine to perform the toothbrush simulator cycle for each test object, the operating including moving the plurality of test objects such that the material usable for forming clear dental aligners on the cover of each test object rubs against its respective composite object in accordance with the toothbrush simulator cycle selected for each test object.

11. The method of claim 10, further comprising adding at least one selected from among the group consisting of a fluid and toothpaste to an interface between the cover of each test object and the composite object that each cover rubs against.

12. The method of claim 11, wherein the fluid is water.

13. The method of claim 1, wherein the plurality of abrasive objects includes a same material on an exterior of each said abrasive object, and the plurality of composite objects includes at least two composite objects made of different composite material.

14. The method of claim 1, wherein the using of the composite material to make an attachment for a tooth of a clear dental aligner therapy patient includes:
    forming a first attachment of a same composite material as the composite object identified as having the least amount of wear; and
    affixing the first attachment to a tooth of a dental patient.

15. The method of claim 14, further comprising:
    forming a clear aligner; and wearing the clear alignment on the dental patient's mouth, the wearing causing the clear aligner to rub against the attachment.

16. The method of claim 15, wherein the clear aligner is formed of a same abrasive material as the material included in the exterior of the plurality of abrasive objects.

\* \* \* \* \*